3,205,081
REFRACTORY
Eldon D. Miller, Jr., Bridgeville, Pa., assignor to Harbison-Walker Refractories Company, Pittsburgh, Pa., a corporation of Pennsylvania
No Drawing. Filed Oct. 12, 1962, Ser. No. 230,277
3 Claims. (Cl. 106—65)

This invention relates to refractory useful in process equipment for pressure pouring of molten metal. In a particular embodiment, it relates to improved refractory conduits for conducting molten metal from a molten metal containing vessel to a mold.

It previously has been proposed to discharge molten metal from a furnace, by applying gas or air under pressure to the surface of the molten metal bath in a furnace chamber or a crucible in a furnace chamber, to force the molten metal through an upwardly extending discharge tube out through an upper portion of the furnace chamber. Previously available refractory conduits, for confining and directing the flow of molten metal from the molten metal-containing vessel or ladle, have been satisfactory to some extent. However, in the attempt to improve various chemical and physical properties in the refractory material, other desirable properties have often been sacrificed. For example, problems of warping, resulting, in part, from excessive internal glass formation, susceptibility to cracking and spalling due to poor thermal shock resistance, variation in permeability when subjected to cyclic variation in temperature, have been present either alone or in combination in many previously available refractory conduits.

Accordingly, it is an object of this invention to provide improved refractory conduit having good thermal shock resistance, good physical stability, i.e., resists the tendency to warp upon heating, and having little variation in permeability when subjected to cyclic variation in temperature. It is another object of the invention to provide an improved refractory composition for fabrication of such as refractory conduits. And it is still another object of the invention to provide an improved refractory composition for the casting of refractory shapes.

The above and other objects and advantages of this invention will be more readily apparent to those skilled in the metallurgical and ceramic arts from a study of the following detailed description. The examples set forth in the following discussion are given by way of explanation and not limitation.

A refractory batch was prepared of about 80%, by weight, calcined South American bauxite, about 10% calcined alumina, about 10% of an air floated ball clay plasticizer, and sufficient tempering fluid as to allow easy flowability for casting (preferably about 8% water added to the batch). The ball clay and the alumina were substantially all −325 mesh. The bauxite was so size graded as to provide the following typical screen analysis for the total batch: about 55% on a 65 mesh screen with about 25% thereof in the range 3 to 6 on 10 mesh. The remaining 45% of the mix passed a 65 mesh screen. About 85% of the −65 mesh fraction passed a 150 mesh screen.

The resulting batch was cast into shapes and burned at cone 15 (2550° F). The resulting shapes had a modulus of rupture of 1500 p.s.i. and a cold crushing strength of 7940 p.s.i. The permeability of the resulting shapes was about 0.04 cu. in./sec./in.$^2$/in. thickness/lb. air pressure. Upon heating to 2910 and cooling, the permeability was 0.05 cu. in./sec./in.$^2$/in. thickness/lb. air pressure. In an ASTM spalling test, the fired shapes were resistant to cracking, indicating good thermal shock resistance.

Lengths of tubing were fabricated of the foregoing refractory mix and were placed in a steel pressure pouring system. They provided a service life twice as long as that of previously used refractory compositions.

Microscopic examination of the fired conduits and shapes discussed above, indicated internal structure characterized by relatively coarse and large bauxite particles relatively loosely bonded in a mullite groundmass. The groundmass was characterized by a network of tesselated cracks. The network of tesselated cracks appears to provide for stress relief during cyclic variation in temperature.

While in the foregoing discussion, calcined South American bauxite was mentioned, it is to be understood that other high alumina refractory materials may be substituted therefor. For example, one may use calcined diasporitic clays, other calcined bauxitic clays, such as calcined Alabama bauxite, calcined tabular alumina, commercially-available synthetic high alumina refractory grain, and mixtures thereof. It is essential, however, that the high alumina material selected analyze at least about 50% $Al_2O_3$, by weight, and on the basis of an oxide analysis. Also, it should constitute about 75 to 85%, and preferably about 80%, of the total weight of the refractory batch. The ball clay plasticizer may constitute from 5 to 15% of the total weight of the batch, with the remainder being a high purity finely divided (−325 mesh) calcined alumina material, such as tabular alumina, with which it reacts, upon firing, to form mullite. In no event should there be less than about 5%, by weight, of −325 mesh calcined alumina. While all of the plasticizer and at least some calcined alumina should pass a 150 mesh screen, best results are obtained when −325 mesh plasticizer and finely divided alumina are present in equal weight quantities.

The grain sizing of the refractory material for fabricating batches according to this invention is very important. There must be more than 50% of the total batch on a 65 mesh screen. If less than about 50% of the batch rests on a 65 mesh screen, fired shapes made therefrom are characterized by excessive rigidity and lack the desired network of tesselated cracks. Thus, they are susceptible to cracking and spalling when subjected to cyclic variation in temperature. A workable range for the +65 mesh fraction is about 50 to 70%. It is also necessary that at least about 25%, but no more than about 35%, of the +65 mesh fraction be in the range 3 to 6 on 10 mesh. When greater than about 35% of the coarse +65 mesh fraction is +10 mesh, internal cracking is excessive; and the permeability tends to increase excessively when subjected to cyclic temperature variation. When less than about 25% of this coarser fraction is in the range 3 to 6 on 10 mesh, an excessively rigid structure results on firing—having the shortcomings discussed above in reference to such rigid structures. One feature of fired refractories of my invention, which I do not fully understand, is that they have low permeability despite the network of tesselated cracks.

As noted above, it is preferred that about 85% of the −65 mesh fraction pass a 150 mesh screen. However, no less than about 70% of the −65 mesh fraction should pass a 150 mesh screeen. The upper limit of a workable range for the −150 mesh fraction is dictated by economic considerations. However, in the interest of presenting a complete description of the invention, upwards of 95% of the −65 mesh fraction can pass a 150 mesh screen and a workable mix will still be had.

In comparative tests, batches were made up of calcined South American bauxite, calcined alumina, and air floated ball clay in varying weight ratios and graded screen sizings. In one test, calcined South American bauxite, calcined alumina and ball clay were prepared in a weight ratio of about 75 to 12.5 to 12.5. The amount of material in the +10 mesh and −150 mesh fraction was varied drastically from my preferred sizing, to provide the following typical screen analysis: about 60% on a 65 mesh screen, and about 50% of the +65 mesh fraction on a 10 mesh screen (in excess of my preferred upper limit). The remainder of the mixture passed a 65 mesh screen, and about 50% thereof passed a 150 mesh screen (less than my preferred lower limit). The modulus of rupture of fired shapes made from this batch averaged about 950 per sq. in. and cold crushing strength about 6800 lb. per sq. in. Permeability after firing to 2250° F. averaged about 0.16 cu. in/sec./in.$^2$/in thickness/lb. air pressure. After reheating to 2910° F. and cooling, the permeability averaged about 0.55 cu. in./sec./in.$^2$/in. thickness/lb. air pressure. Such permeability characteristics are unacceptable according to this invention. Further, it is preferable that the permeability in a service environment, in which the temperature may cyclically vary up to about 3000° F., does not exceed about 0.05 cu. in./sec./in.$^2$/in. thickness/lb. air pressure.

In still another comparative mix, about 70% calcined South American bauxite, about 15% finely divided calcined alumina, and about 15 parts of air floated ball clay were prepared. The mix had a screen analysis substantially the same as that of the preferred mix discussed above. Shapes made therefrom were fixed to 2550° F.; and the resulting shapes had a density, modulus of rupture, and cold crushing strength somewhat less than preferred mixes. However, more important, after heaing to 2910° F. and cooling, the permeability was almost 0.5 cu. in./sec./in$^2$/in. thickness/lb. air pressure.

The comparative testing clearly established the importance of grain sizing for the mixes of this invention. It also clearly established the importance of the quantity of bauxite, i.e., preferably over 75% in order to obtain acceptable permeability characteristics.

In the foregoing discussion, all parts and percentages are by weight, and all screen sizes are according to the Tyler series. Typical chemical analyses of raw materials usable for the practice of this invention are as follows:

|  | Calcined and Tabular Alumina, percent | Calcined Burley Diaspore, percent | Calcined Alabama Bauxite, percent | Calcined South American Bauxite, percent | Ball Clay, percent |
|---|---|---|---|---|---|
| $SiO_2$ | 0.3 | 48.0 | 21.9 | 6.21 | 53.6 |
| $Al_2O_3$ | 99.4 | 47.1 | 74.2 | 88.58 | 30.3 |
| $TiO_2$ |  | 2.4 | 3.4 | 3.37 | 1.7 |
| $Fe_2O_3$ | 0.2 | 1.1 | 0.8 | 1.56 | 0.9 |
| MgO |  | 0.40 | 0.05 |  | 0.49 |
| CaO |  | 0.24 | 0.04 |  | 0.41 |
| Alkalies | 0.1 | 0.56 | 0.02 |  | 12.4 |
| Ignition Loss |  |  |  |  |  |

All chemical analyses are on the basis of an oxide analysis, in conformity with the common practices of reporting the chemical analysis of refractory materials.

The compositions of this invention are particularly adapted to forming refractory shapes according to slip casting techniques. A preferred method for manufacturing a shape using a mix according to this invention is as follows: a high alumina refractory batch is prepared having the materials makeup and preferred screen sizing discussed above. A mixture of from about 6 to 10% of a tempering fluid and about 1/10 to 3/10% of a dispersant, both by weight and based on the dry weight of the batch, is prepared. The tempering fluid-dispersant mixture is added to the batch, and the resulting mixture is flowed into a moisture-absorbent mold. An exemplary material for fabricating a mold is plaster of paris. The resulting molded shape is allowed to dry. Preferably, the green shapes are then fired to about 2550° F. Such fired shapes exhibit the same microscopic characteristics as the other fired shapes of this invention.

Exemplary dispersants well known in the art are, for example, certain sodium phosphates. The commercial sodium phosphite "Calgon" is a useful specific dispersant for the practice of the invention. An exemplary tempering fluid is water.

Having thus described the invention in detail and with sufficient particularity as to enable those skilled in the art to practice it, what is desired to have protected by Letters Patent is set forth in the following claims:

I claim:

1. A fired refractory conduit made from a high alumina refractory batch consisting of 75 to 85%, by weight, of selected high alumina refractory material, said selected material analyzing at least about 50% $Al_2O_3$, by weight on an oxide analysis, about 5 to 15%, by weight, minus 65 mesh ball clay plasticizer, the remainder being finely divided calcined alumina; 50 to 75% of the batch resting on a 65 mesh screen and 30 to 50% passing a 65 mesh screen, the fraction resting on a 65 mesh screen being from 25 to 35% minus 3 and resting on a 10 mesh screen, of that fraction passing 65 mesh at least 70% thereof passing a 150 mesh screen and a portion thereof passing 325 mesh, the portion passing 325 mesh containing at least a total of 10%, based on the total batch weight, of calcined alumina and ball clay, the calcined alumina and ball clay passing a 325 mesh screen being present in substantially equal quantities, said conduit characterized as having relatively coarse high alumina refractory material loosely bonded in place by a mullite matrix having a network of tessellated cracks.

2. A high alumina refractory batch consisting of 75 to 85%, by weight, of selected high alumina refractory material, said selected material analyzing at least about 50% $Al_2O_3$, by weight on an oxide analysis, about 5 to 15% by weight, of minus 65 mesh ball clay plasticizer, the remainder being finely divided calcined alumina; 50 to 70% of the batch resting on a 65 mesh screen, and 30 to 50% passing 65 mesh, of the fraction resting on a 65 mesh screen from 25 to 35% being minus 3 and resting on a 10 mesh screen, of that fraction passing 65 mesh at least 70% thereof passing a 150 mesh screen and a portion thereof also passing 325 mesh, the portion passing 325 mesh containing at least a total of 10% based on the total batch weight of calcined alumina and ball clay, the calcined alumina and ball clay passing 325 mesh being present in substantially equal quantities.

3. That method of manufacturing a high alumina refractory shape which comprises the steps of preparing a high alumina refractory batch consisting of 75 to 85%, by weight, of a selected high alumina refractory material, said selected material analyzing at least about 50% $Al_2O_3$, by weight on an oxide analysis, about 5 to 15%, by weight, of minus 65 mesh ball clay plasticizer, the remainder being finely divided calcined alumina; 50 to 70% of the batch resting on a 65 mesh screen and 30 to 50% passing 65 mesh, of the fraction resting on a 65 mesh screen from 25 to 35% being 3 on 10 mesh, of that fraction passing 65 mash at least 70% thereof passing a 150 mesh screen and a portion thereof also passing 325 mesh, the portion passing 325 mesh containing at least a total of 10%, based on the total batch weight, calcined alumina and ball clay in substantially equal quantities, preparing a mixture of about 6 to 10% of a tempering fluid and about 0.1 to 0.3% of a dispersant, both by weight and based on the total dry weight of the batch, adding the tempering fluid-dispersant mixture to the batch of refractory ingredients, preparing a moisture absorbent mold, flowing the wet batch into the mold, recovering a cast shape, drying the resultant shape, firing the dried shape, said shape characterized as having relatively coarse high alumina refractory material loosely bonded in place by a mullite matrix having a network of tessellated cracks.

References Cited by the Examiner

UNITED STATES PATENTS

| | | | |
|---|---|---|---|
| 2,569,430 | 9/51 | Schroeder et al. | 106—65 |
| 3,128,194 | 4/64 | Christie | 106—65 |
| 3,135,616 | 6/64 | Norton | 106—65 |

TOBIAS E. LEVOW, *Primary Examiner.*

UNITED STATES PATENT OFFICE
CERTIFICATE OF CORRECTION

Patent No. 3,205,081                      September 7, 1965

Eldon D. Miller, Jr.

It is hereby certified that error appears in the above numbered patent requiring correction and that the said Letters Patent should read as corrected below.

Column 4, line 32, for "75%" read -- 70% --; line 73, for "mash" read -- mesh --.

Signed and sealed this 18th day of October 1966.

(SEAL)
Attest:

ERNEST W. SWIDER
Attesting Officer

EDWARD J. BRENNER
Commissioner of Patents